Patented Sept. 14, 1954

2,689,248

UNITED STATES PATENT OFFICE 2,689,248

TERTIARY-AMINOALKYL 4-AMINO-2-ALKOXYBENZOATES AND THEIR SYNTHESIS

Raymond O. Clinton, Rensselaer, and Stanley C. Laskowski, Menands, N. Y., assignors to Sterling Drug Inc., New York, N. Y., a corporation of Delaware No Drawing. Application June 17, 1950, Serial No. 168,843

13 Claims. (Cl. 260—294.3)

This invention relates to tertiary-aminoalkyl 4-amino-2-alkoxy-benzoates, to water-soluble acid-addition salts thereof, and to the preparation of these new compounds.

The basic esters of our invention have the general formula

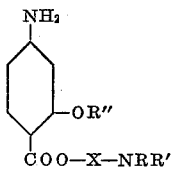

where R″ is a lower alkyl radical having 2–6 carbon atoms, X is a lower alkylene radical having 2–4 carbon atoms and NRR′ is a lower aliphatic-like tertiary-amino radical. These esters, preferably in the form of their water-soluble acid-addition salts, have been found to possess outstanding local anesthetic properties.

In the above general formula, the lower alkyl radical represented by R″ has 2–6 carbon atoms, including such examples as ethyl, n-propyl, isobutyl, 2-butyl, 3-amyl, n-hexyl and the like. The lower alkylene radical designated hereinabove as X has 2–4 carbon atoms and has its two free valence bonds on different carbon atoms. Thus, X includes such examples as —CH₂CH₂—,

—CH₂CH₂CH₂—

—CH₂CH₂CH₂CH₂—, —CH₂CH(CH₃)CH₂—, and the like. The lower aliphatic-like tertiary-amino radical shown above as NRR′ comprehends lower dialkylamino radicals where R and R′ are lower alkyl groups, alike or different, and each alkyl group having preferably 1–6 carbon atoms, such dialkylamino radicals including dimethylamino, diethylamino, ethylmethylamino, diisopropylamino, di-n-butylamino, di-n-hexylamino and the like. Further, the lower aliphatic-like tertiary-amino radical designated as NRR′ encompasses those radicals where R and R′ are joined directly or through an oxygen atom to form saturated N-heteromonocyclic radicals having 5–6 ring atoms, illustrated by examples such as 1-piperidyl, 2-methyl-1-piperidyl, 3-ethyl-1-piperidyl, 4-methyl-1-piperidyl, 2,6-dimethyl-1-piperidyl, 1-pyrrolidyl, 2-methyl-1-pyrrolidyl, 2,5-dimethyl-1-pyrrolidyl, 4-morpholinyl, and the like.

The basic esters of our invention are conveniently prepared from 4-nitro-2-hydroxybenzoic acid as illustrated by the following series of reactions wherein R″, X and NRR′ have the meanings given hereinabove:

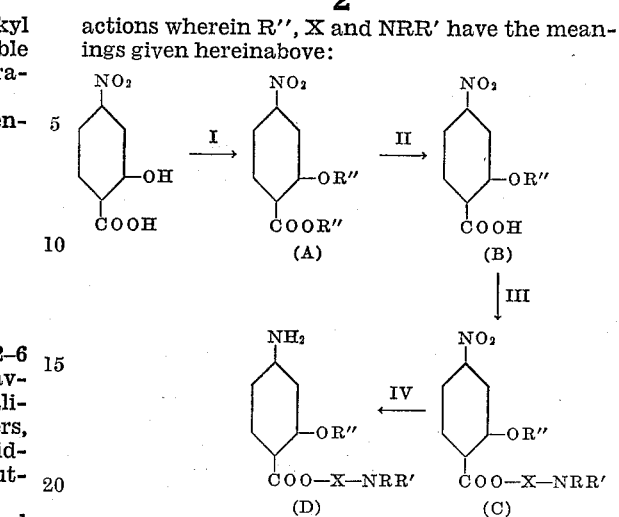

Thus, in step I 4-nitro-2-hydroxybenzoic acid is converted into a lower alkyl 4-nitro-2-alkoxybenzoate (A). In step II the lower alkyl 4-nitro-2-alkoxybenzoate is saponified to yield the corresponding 4-nitro-2-alkoxy-benzoic acid (B), which in step III is esterified to produce the corresponding tertiary-aminoalkyl 4-nitro-2-alkoxybenzoate (C). Then, in step IV the basic nitro ester (C) is reduced to the corresponding tertiary-aminoalkyl 4-amino-2-alkoxybenzoate (D). A specific illustration of this series of reactions is the formation of 2-dimethylaminoethyl 4-amino-2-ethoxybenzoate by converting 4-nitro-2-hydroxybenzoic acid into ethyl 4-nitro-2-ethoxybenzoate, saponifying this ester to produce 4-nitro-2-ethoxybenzoic acid, esterifying this acid to form 2-dimethylaminoethyl 4-nitro-2-ethoxybenzoate and reducing the nitro group of said basic ester to form the corresponding 2-dimethylaminoethyl 4-amino-2-ethoxybenzoate. In practicing our invention we preferably carried out step I by reacting 4-nitro-2-hydroxybenzoic acid with an alkyl benzenesulfonate and potassium carbonate in refluxing xylene. We carried out esterification step III by two different procedures: in one, the 4-nitro-2-alkoxybenzoic acid was reacted with a tertiary-aminoalkyl halide; and in the other procedure, the 4-nitro-2-alkoxybenzoic acid was first converted into the corresponding acid chloride which in turn was treated with a tertiary-aminoalkanol. The esterification step III also can be carried out by directly reacting the 4-nitro-2-alkoxybenzoic acid with a tertiary-aminoalkanol in the presence of a suitable esterification catalyst such as dry hydrogen chloride. An alternative method of obtaining the basic nitro ester (C) is by transesterifying the alkyl nitro ester (A) with a tertiary-aminoalkanol and removing from the reaction mixture the formed alkanol, R''OH. The reduction step IV was carried out both by chemical methods and by catalytic hydrogenation. Suitable chemical reducing agents include iron and hydrochloric acid, ferrous sulfate and ammonia, tin and hydrochloric acid, sodium hydrosulfite, etc. In practicing our invention, we preferably used iron and hydrochloric acid. Catalysts suitable when catalytic hydrogenation is employed include Raney nickel, platinum, palladium, or other catalysts generally effective to catalyze hydrogenation of nitro groups to amino groups.

The tertiary-aminoalkyl esters of our invention are therapeutically active whether employed as the free bases or as their salts with relatively non-toxic organic or inorganic acids. In practicing our invention we found it convenient to isolate the basic esters as their phosphates or hydrochlorides. However, other acid-addition salts are within the scope of our invention. Such additional salts include the hydrobromides, sulfates, citrates, sulfamates, tartrates, succinates, acetates, benzoates, oleates, and the like.

Specific embodiments of our invention are illustrated in the following paragraphs.

(A) *Alkyl 4-nitro-2-alkoxybenzoates*

The preparation of these alkyl esters is illustrated by the following preparation of ethyl 4-nitro-2-ethoxybenzoate: A stirred mixture of 73.7 g. of 4-nitro-2-hydroxybenzoic acid, 118.0 g. of anhydrous potassium carbonate and 178.8 g. of ethyl benzenesulfonate in 2 liters of xylene was refluxed under a continuous water separator for nineteen hours. The insoluble potassium salts were filtered off and washed with hot dry toluene. The combined filtrate and washings were distilled under reduced pressure to remove the solvents, thereby leaving a residual oil which solidified on cooling. The solid was recrystallized from methanol, yielding ethyl 4-nitro-2-ethoxybenzoate as cottony yellow needles, M. P. 53.9–54.4° C. (corr.); yield 93%. Also prepared by the above procedure, each in yields of greater than 95% were the following: n-propyl 4-nitro-2-n-propoxybenzoate, oil; n-butyl 4-nitro-2-n-butoxybenzoate, oil; isobutyl 4-nitro-2-isobutoxybenzoate, oil; and n-hexyl 4-nitro-2-n-hexoxybenzoate, oil.

Similar results were obtained when in the above procedure the corresponding, but more expensive, alkyl toluenesulfonates were used as alkylating agents in place of the alkyl benzenesulfonates.

Alkyl 4-nitro-2-alkoxybenzoates where in the two alkyl groups (ester and ether) differ can be prepared by alkylating an alkyl 4-nitro-2-hydroxybenzoate. Such a procedure is illustrated by the following preparation of methyl 4-nitro-2-n-propoxybenzoate: A mixture of 19.7 g. of methyl 4-nitro-2-hydroxybenzoate, 15.2 g. of anhydrous potassium carbonate, 24 g. of n-propyl benzenesulfonate and 500 ml. of xylene was refluxed with stirring under a continuous water separator for fifty-four hours. The resulting mixture was processed according to the foregoing example to give a 95% yield of methyl 4-nitro-2-n-propoxybenzoate, M. P. 42.3–43.9° C. (corr.). In a similar manner, using the appropriate alkyl 4-nitro-2-hydroxybenzoate and the appropriate alkyl benzenesulfonate, the following esters were obtained: methyl 4-nitro-2-n-butoxybenzoate, an oil; and ethyl 4-nitro-2-n-butoxybenzoate, M. P. 38.7–40.6° C. (corr.).

(B) *4-nitro-2-alkoxybenzoic acids*

The preparation of these acids by saponifying the above-described alkyl 4-nitro-2-alkoxybenzoates (A) is illustrated by the following preparation of 4-nitro-2-ethoxybenzoic acid: The unrecrystallized ethyl 4-nitro-2-ethoxybenzoate obtained after removal of the solvents in the foregoing procedure (A) was dissolved in 1600 ml. of 50% aqueous ethanol. To this solution was added 2 to 3 molecular equivalents of sodium carbonate, and the resulting mixture was stirred under reflux for sixteen hours. After the ethanol has been distilled off under reduced pressure, the remaining aqueous solution was diluted with water and made acidic with concentrated hydrochloric acid. The precipitated yellow solid was filtered, washed with water, dried in a vacuum oven at 90° C. and recrystallized from ethyl acetate. There was thus obtained a 98% yield of 4-nitro-2-ethoxybenzoic acid as rosettes of yellow needles, M. P. 147.3–148.2° C. (corr.).

Additional 4-nitro-2-alkoxybenzoic acids prepared according to the above procedure include: 4 - nitro - 2 - n - propoxybenzoic acid, 94% yield, M. P. 148.5–149.4° C. (corr.); 4-nitro-2-n-butoxybenzoic acid, 95.5% yield, M. P. 120.9–122.8° C. (corr.); 4 - nitro - 2 - isobutoxybenzoic acid, 93% yield M. P. 158.6–159.6° C. (corr.); and 4-nitro-2-n-hexoxybenzoic acid, 94% yield, M. P. 86.3–87.0° C. (corr.).

When the 4-nitro-2-alkoxybenzoic acids were prepared from the unrecrystallized alkyl 4-nitro-2-alkoxybenzoates, as in the above procedure, there was present a very small amount of brown resinous material, insoluble in ethyl acetate, benzene and related non-polar solvents. We found that it was not necessary to remove this impurity in successfully carrying out our invention. However, said impurity was readily removed by dissolving the 4-nitro-2-alkoxybenzoic acid in ethyl acetate, filtering off the impurity, and cooling the filtrate to precipitate said acid. To insure complete precipitation, n-hexane was added to the mixture. Said brown impurity was not present when the 4-nitro-2-alkoxybenzoic acids were prepared from the recrystallized alkyl 4-nitro-2-alkoxybenzoates in the above manner.

(C) *Tertiary-aminoalkyl 4-nitro-2-alkoxybenzoates*

These tertiary-aminoalkyl esters were prepared by esterifying the 4-nitro-2-alkoxybenzoic acids described above. In practicing our invention we prepared these basic esters by two procedures: one, by reacting a tertiary-aminoalkyl halide with a 4-nitro-2-alkoxybenzoic acid in an appropriate solvent; and the other procedure, by reacting a 4-nitro-2-alkoxybenzoyl halide with a tertiary-aminoalkanol. The former alternative is illustrated by the following syntheses of 3-(1-piperidyl)propyl 4-nitro-2-ethoxybenzoate and 2-dimethylaminoethyl 4-nitro - 2 - n - butoxybenzoate.

*3 - (1 - piperidyl)propyl 4-nitro-2-ethoxybenzoate.*—A stirred mixture of 42.2 g. of 4-nitro-2-ethoxybenzoic acid and 38.8 g. of 3-(1-piperidyl)-propyl chloride in 500 ml. of isopropanol was refluxed for twenty-four hours. (The addition of a small amount of potassium or sodium iodide decreases the reaction time necessary to about ten to fifteen hours.) The solvent was removed by distilling in vacuo and the remaining mobile brown oil was poured into a 2 liter beaker and diluted with absolute ether to a volume of about 1.5 liters. The precipitated pale yellow solid was filtered and washed with absolute ether. This solid was then dissolved in water, the solution made basic to litmus with 35% sodium hydroxide solution and the liberated basic ester extracted with ethyl acetate. To insure complete extraction of the basic ester, sodium chloride was added to the aqueous solution and the resulting mixture was extracted further with ethyl acetate. The combined extracts were dried over anhydrous calcium sulfate. After removal of the solvent by distilling in vacuo, there remained 65 g. (97%) of 3 - (1 - piperidyl)propyl 4-nitro-2-ethoxybenzoate as a viscous brown oil. A portion of this basic ester was converted into the monohydrochloride salt by dissolving it in benzene and adding to the resulting solution an excess of anhydrous ether containing 20% by weight of anhydrous hydrogen chloride. The resulting oil was separated from the supernatant liquid by decantation, and was then dissolved in isopropanol. The isopropanol solution was slowly diluted with n-hexane to turbidity. The separated yellow salt was recrytsallized from isopropanol and ethanolic hydrogen chloride, yielding as yellow needles, 3-(1-piperidyl)propyl 4-nitro-2-ethoxybenzoate hydrochloride, which, after being filtered, washed with n-hexane and dried under 100° in vacuo, melted at 147–147.3° C. (corr.).

*2-dimethylaminoethyl 4-nitro-2-n-butoxybenzoate.*—A mixture of 23.9 g. of 4-nitro-2-n-butoxybenzoic acid, 15.2 g. of anhydrous potassium carbonate and 400 ml. of dry toluene was refluxed and stirred under a continuous water separator. When the evolution of water had ceased (three hours), the water separator was removed and there was added 12.9 g. of dimethylaminoethyl chloride. The mixture was then refluxed with stirring for twenty hours, filtered while hot, and the solvent was removed from the filtrate by distilling in vacuo. The residual oil was dissolved in dilute hydrochloric acid, the solution was decolorized with activated carbon and the base was liberated by the addition of excess ammonia. The base was extracted with ethyl acetate, the solution was dried, and the ethyl acetate was removed by distilling in vacuo, yielding 26.5 g. of (85.5%) 2-dimethylaminoethyl 4-nitro-2-n-butoxybenzoate as a pale yellow oil.

The other procedure we used in preparing the tertiary-aminoalkyl 4-ntiro-2-alkoxybenzoates, or the reaction of a corresponding 4-nitro-2-alkoxybenzoyl halide with a tertiary-aminoalkanol, is illustrated by the following preparation of 2-dimethylaminoethyl 4-nitro-2-ethoxybenzoate hydrochloride: To a cooled solution of 45.8 g. of 4-nitro-2-ethoxybenzoyl chloride (prepared in quantitative yield by refluxing a mixture of 42 g. of 4-nitro-2-ethoxybenzoic acid, 47.6 g. of thionyl chloride and 125 ml. of dry benzene for two hours, evaporating in vacuo, adding dry benzene and again evaporating in vacuo) dissolved in 250 ml. of dry benzene was added slowly 17.8 g. of 2-dimethylaminoethanol dissolved in 100 ml. of dry benzene. The tan product began to crytsallize immediately. To insure more complete precipitation of the product, the mixture was diluted with dry benzene to a total volume of about 800 ml. After collecting the precipitate, the mother liquor was concentrated in vacuo thereby yielding a second crop. The combined precipitates were recrystallized, with decolorization using activated carbon, from isopropanol, thereby yielding as a pale yellow salt, 2-dimethylaminoethyl 4-nitro-2-ethoxybenzoate hydrochloride, which, after being dried at 100° C. in vacuo, melted at 140.5–141.2° C. (corr.).

In the preparation of the acid chlorides where the 2-alkoxy substituent is higher than ethoxy (e. g., 4-nitro-2-n-butoxybenzoyl chloride), the reaction is run with pyridine as the hydrogen chloride acceptor to prevent cleavage of the alkoxy group. This procedure is illustrated as follows: To 1 mole of acid and 1.2 mole of pure pyridine in 4 volumes of dry benzene add 1.0 mole of thionyl chloride at 25° C., reflux one-half hour, cool in ice, add with stirring 1.0 mole of the basic alcohol, mix well. Remove solvent in vacuo and dissolve residue in water. Add excess ammonium hydroxide and extract with toluene. Dry and remove toluene in vacuo, add more toluene and again evaporate in vacuo (this is to remove pyridine), leaving the pure base.

Additional tertiary-aminoalkyl 4-nitro-2-alkoxybenzoates, in the form of their hydrochlorides, prepared according to the above described procedures are given in Table A.

TABLE A $$\text{NO}_2\text{—}\underset{\text{COO(CH}_2)_n\text{—NRR'·HCl}}{\bigcirc}\text{—OR''}$$

| n | R'' | NRR' | M. P./°C. (corr.) |
|---|---|---|---|
| 2 | $C_2H_5$ | $N(C_2H_5)_2$ | 131.0–132.0 |
| 2 | $n\text{-}C_3H_7$ | $N(CH_3)_2$ | 158.7–159.5 |
| 2 | $n\text{-}C_3H_7$ | $N(C_2H_5)_2$ | 131.0–132.0 |
| 3 | $n\text{-}C_3H_7$ | $NC_5H_{10}{}^a$ | 147.3–148.6 |
| 2 | $n\text{-}C_4H_9$ | $N(CH_3)_2$ | 108.8–110.7 |
| 2 | $n\text{-}C_4H_9$ | $N(C_2H_5)_2$ | 108.0–110.4 |
| 2 | $n\text{-}C_4H_9$ | $NC_5H_{10}{}^a$ | 138.8–139.6 |
| 3 | $n\text{-}C_4H_9$ | $N(C_2H_5)_2$ | 123.0–124.2 |
| 3 | $C_2H_5$ | $N(C_2H_5)_2$ | 128.3–129.3 |
| 3 | $n\text{-}C_3H_7$ | $N(C_2H_5)_2$ | 101.4–102.0 |
| 2 | $i\text{-}C_4H_9$ | $N(C_2H_5)_2$ | 156.0–158.0 |
| 3 | $i\text{-}C_4H_9$ | $NC_5H_{10}{}^a$ | 163.3–165.0 |
| 2 | $n\text{-}C_6H_{13}$ | $N(C_2H_5)_2$ | 77.5–78.5 |
| 3 | $n\text{-}C_6H_{13}$ | $NC_5H_{10}{}^a$ | 133.9–135.2 |

$^a$ $NC_5H_0$ is 1-piperidyl.

Additional tertiary-aminoalkyl 4-nitro-2-alkoxybenzoates which can be prepared according to the procedures described hereinabove include the following: 3-(1-pyrrolidyl)propyl 4-nitro-2-n-proproxybenzoate; 2 - (2,5-dimethyl-1-pyrrolidyl)ethyl 4 - nitro-2-n-hexoxybenzoate; 4 - dimethylaminobutyl 4-nitro-2-n-butoxybenzoate; 2 - (di - n - butylamino)ethyl 4-nitro-2-(2-propoxy)benzoate; 2 - diethylaminoethyl 4-nitro-2-n-amoxybenzoate; 2 - (3-ethyl-1-piperidyl)ethyl 4-nitro-2-isobutoxybenzoate; 3-(2-methyl-1-pyrrolidyl)propyl 4-nitro-2-(3-amoxy)benzoate; 3-dimethylamino-2-propyl 4-nitro-2-n-butoxybenzoate; 2-(4-morpholinyl)ethyl 4-nitro-2-n-hexoxybenzoate; and 2-(2-methyl-1-piperidyl)ethyl 4-nitro-2-ethoxybenzoate.

(D) *Tertiary-aminoalkyl 4-amino-2-alkoxybenzoates*

Exemplary of the preferred procedure for preparing these basic esters is the following preparation of 3 - (1-piperidyl)propyl 4-amino - 2 - ethoxybenzoate: To a hot stirred mixture of 49.9 g. of powdered iron, 1 ml. of concentrated hydrochloric acid and 500 ml. of 80% ethanol was added slowly 50.0 g. of 3-(1-piperidyl)propyl 4-nitro-2-ethoxybenzoate over a period of about ten minutes. The resultant brown-colored solution was heated with stirring for another thirty minutes, after which time 15 g. of sodium bicarbonate was added. The mixture was stirred an additional ten minutes and then filtered through a filter aid which was washed with hot ethanol. The combined filtrate and washings were concentrated by distilling in vacuo, cooled and extracted with ethyl acetate. The combined extracts were dried over anhydrous potassium carbonate and the solvent removed by distilling in vacuo. The pale orange crystalline residue was recrystallized from ethyl acetate-n-hexane and dried at 60° C. thereby yielding 42 g. (91%) of 3-(1-piperidyl)propyl 4-amino-2-ethoxybenzoate, M. P. 90.0–90.8° C. (corr.). The dihyrochloride salt of this basic ester was prepared by dissolving a portion of said basic ester in dry benzene and adding an excess of anhydrous ether containing 20% by weight of anhydrous hydrogen chloride. The gummy precipitate was separated from the supernatant liquid by decanting, and was dissolved in isopropanol. When cooled, the isopropanol solution yielded a white precipitate. Recrystallization of this precipitate from absolute ethanol yielded, in the form of white needles, 3-(1-piperidyl)propyl 4-amino-2-ethoxybenzoate dihydrochloride, M. P. 171.6–176.6° C. (corr.). Alternatively, the phosphate may be prepared by treating a solution of the base in absolute alcohol with an equivalent amount of 85% phosphoric acid, filtering the precipitated phosphate and recrystallizing the same from dilute ethanol.

The above reduction of the tertiary-aminoalkyl 4-nitro-2-alkoxybenzoates to yield the corresponding 4-amino esters can be carried out by catalytic hydrogenation as illustrated by the following general preparations: Ten grams of the tertiary-aminoalkyl 4-nitro-2-alkoxybenzoate in 150 ml. of ethanol is hydrogenated using 50 lbs. pressure of hydrogen at 25° C. in the presence of 2 g. of Raney nickel. After the rapid exothermic reaction, the catalyst is filtered off and the filtrate evaporated to dryness. The resulting residue is dissolved in benzene and hydrogen chloride is added as above. Alternatively, other catalysts can be employed as exemplified in the following use of platinum: Fifteen grams of tertiary-aminoalkyl 4-nitro-2-alkoxybenzoate in 150 ml. of ethanol is reduced at 25 lbs. pressure of hydrogen at 25° C. in the presence of 200 mg. of platinum oxide monohydrate and 5 ml. of concentrated hydrochloric acid. After the rapid exothermic reaction, the catalyst is filtered off and the filtrate distilled in vacuo to remove the alcohol. The residue is taken up in water and potassium carbonate is added to the resulting solution to liberate the basic ester, which is extracted with benzene. The benzene extract is dried and treated with excess hydrogen chloride as above to give the tertiary-aminoalkyl 4-amino-2-alkoxybenzoate dihydrochloride.

The preparation of monohydrochlorides of the tertiary-aminoalkyl 4-amino-2-alkoxybenzoates is exemplified by the following description: To a solution of 70.0 g. of pure 2-diethylaminoethyl 4-amino-2-n-propoxybenzoate in 600 ml. of ethyl acetate was added an excess of 20% ethereal hydrogen chloride. After mixing well, the supernatant liquid was decanted from the precipitated thick gum, and the gum was washed by successive trituration with 200 ml. of absolute ether and 300 ml. of warm ethyl acetate. The gum was dissolved in 300 ml. of absolute alcohol, and to the solution was added 78.0 g. of pure 2-diethylaminoethyl 4-amino-2-n-propoxybenzoate. The clear solution was slowly diluted to two liters with ethyl acetate and the crystalline precipitate was collected and washed with ethyl acetate. The product was recrystallized by dissolution in a mixture of 300 ml. of absolute alcohol and 400 ml. of isopropyl alcohol, decolorization with activated charcoal, and dilution while warm with one liter of ethyl acetate and one liter of absolute ether. 2 - diethylaminoethyl 4-amino-2-n-propoxybenzoate monohydrochloride crystallized in large white prisms, M. P. 148.3–150.0° C. (corr.). The yield was 126 grams.

Alternatively, the pure base is dissolved in absolute alcohol, an aliquot portion is titrated with standard acid, and the calculated amount of a standard solution of hydrogen chloride in absolute alcohol is added. The monohydrochloride is precipitated by the addition of excess absolute ether and recrystallized as outlined above.

Additional tertiary-aminoalkyl 4-amino-2-alkoxybenzoates, in the form of their phosphates or hydrochlorides, prepared according to the above procedures are given in Table B.

TABLE B

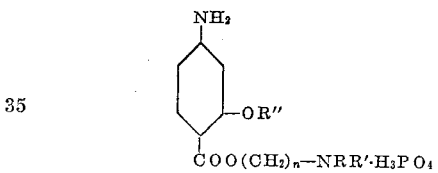

| $n$ | $R''$ | $NRR'$ | M. P./° C. (corr.) |
|---|---|---|---|
| 2 | $C_2H_5$ | $N(CH_3)_2$ | 76.2–77.1 [b] |
| 2 | $C_2H_5$ | $N(C_2H_5)_2$ | 151.8–152.8 [f] |
| 2 | $n-C_3H_7$ | $N(CH_3)_2$ | 157.0–160.0 [c, g] |
| 2 | $n-C_3H_7$ | $N(C_2H_5)_2$ | 132.8–136.8 [e] |
| 3 | $n-C_3H_7$ | $NC_5H_{10}$ [a] | 169.4–172.0 [c, d, g] |
| 2 | $n-C_4H_9$ | $N(CH_3)_2$ | 156.8–159.0 [c, g] |
| 2 | $n-C_4H_9$ | $N(C_2H_5)_2$ | 125.4–126.4 [e] |
| 3 | $n-C_4H_9$ | $NC_5H_{10}$ [a] | 80.0–83.0 |
| 3 | $C_2H_5$ | $N(C_2H_5)_2$ | 148.3–150.9 [c] |
| 3 | $n-C_3H_7$ | $N(C_2H_5)_2$ | 154.9–155.3 [c, g] |
| 3 | $C_2H_5$ | $N(C_2H_5)_2$ | 152.5–154.5 [c] |
| 2 | $i-C_4H_9$ | $N(C_2H_5)_2$ | 128.6–129.6 [e] |
| 3 | $i-C_4H_9$ | $NC_5H_{10}$ [a] | 178.7–179.8 [e] |
| 2 | $n-C_6H_{13}$ | $N(C_2H_5)_2$ | 130.5–133.5 [e] |
| 3 | $n-C_6H_{13}$ | $NC_5H_{10}$ [a] | 133.2 [e] |

[a] $NC_5H_{10}$ = 1-piperidyl.
[b] M. P. of base.
[c] Dihydrochloride.
[d] M. P. of base is 62.8–64.0° C. (corr.).
[e] Monohydrochloride.
[f] M. P. of base is 92.0–93.8° C. (corr.).
[g] With decomposition.

Additional tertiary-aminoalkyl 4-amino-2-alkoxybenzoates which can be prepared according to the procedures described hereinabove include the following: 3-(1-pyrrolidyl)propyl 4-amino-2-n-propoxybenzoate; 2-(2,5-dimethyl-1-pyrrolidyl)ethyl 4-amino-2-n-hexoxybenzoate; 4-dimethylaminobutyl 4-amino-2-n-butoxybenzoate; 2-(di-n-butylamino)ethyl 4-amino-2-(2-propoxy)benzoate; 2-diethylaminoethyl 4-amino-2-n-amoxybenzoate; 2-(3-ethyl-1-piperidyl)ethyl 4-amino-2-isobutoxybenzoate; 3-(2-methyl-1-pyrrolidyl)propyl 4-amino-2-(3-amoxy)benzoate; 3-dimethyl-2-propyl 4-amino-2-n-butoxybenzoate; 2-(4-morpholinyl)ethyl 4-amino-2-n-hexoxybenzoate; and 2-(2-methyl-1-piperidyl)-ethyl 4-amino-2-ethoxybenzoate.

We claim:
1. A member of the group consisting of a basic ester having the formula

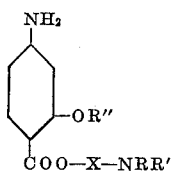

where NRR' is a tertiary-amino radical selected from the group consisting of lower dialkylamino, 1-piperidyl, (lower alkylated)-1-piperidyl, 1-pyrrolidyl, (lower alkylated)-1-pyrrolidyl and 4-morpholinyl, X is a lower alkylene radical having 2-4 carbon atoms and R" is a lower alkyl radical having 2-6 carbon atoms, and acid-addition salts thereof.

2. An acid-addition salt of a basic ester having the formula

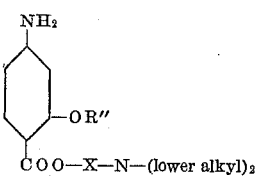

where X is a lower alkylene radical having 2-4 carbon atoms and R" is a lower alkyl radical having 2-6 carbon atoms.

3. An acid-addition salt of a basic ester having the formula

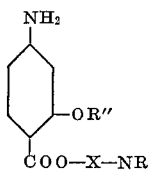

where R" is a lower alkyl radical having 2-6 carbon atoms, X is a lower alkylene radical having 2-4 carbon atoms and NRR' is a 1-piperidyl radical.

4. An acid-addition salt of a basic ester having the formula

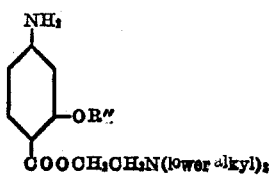

where R" is a lower alkyl radical having 2-6 carbon atoms.

5. An acid-addition salt of a basic ester having the formula

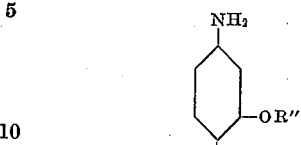

where R" is a lower alkyl radical having 2-6 carbon atoms.

6. An acid-addition salt of 2-diethylaminoethyl 4-amino-2-n-propoxybenzoate.
7. An acid-addition salt of 2-diethylaminoethyl 4-amino-2-n-butoxybenzoate.
8. An acid-addition salt of 2-diethylaminoethyl 4-amino-2-n-hexoxybenzoate.
9. An acid-addition salt of 2-diethylaminoethyl 4-amino-2-ethoxybenzoate.
10. An acid-addition salt of 3-(1-piperidyl)propyl-4-amino-2-n-propoxybenzoate.
11. 2-diethylaminoethyl 4-amino-2-n-propoxybenzoate monohydrochloride.
12. 2-diethylaminoethyl 4-amino-2-n-butoxybenzoate monohydrochloride.
13. 2-diethylaminoethyl 4-amino-2-n-hexoxybenzoate monohydrochloride.

References Cited in the file of this patent

UNITED STATES PATENTS

| Number | Name | Date |
|---|---|---|
| 1,317,250 | Wildman | Sept. 30, 1919 |
| 2,288,334 | Vliet | June 30, 1942 |
| 2,376,860 | Blicke | May 29, 1945 |

FOREIGN PATENTS

| Number | Country | Date |
|---|---|---|
| 317,296 | Great Britain | 1930 |
| 349,640 | Great Britain | 1931 |